April 4, 1939.　　　　F. J. TARRIS　　　　2,153,029
VALVE FOR VEHICLE BRAKES
Filed Jan. 14, 1937　　　　2 Sheets-Sheet 1
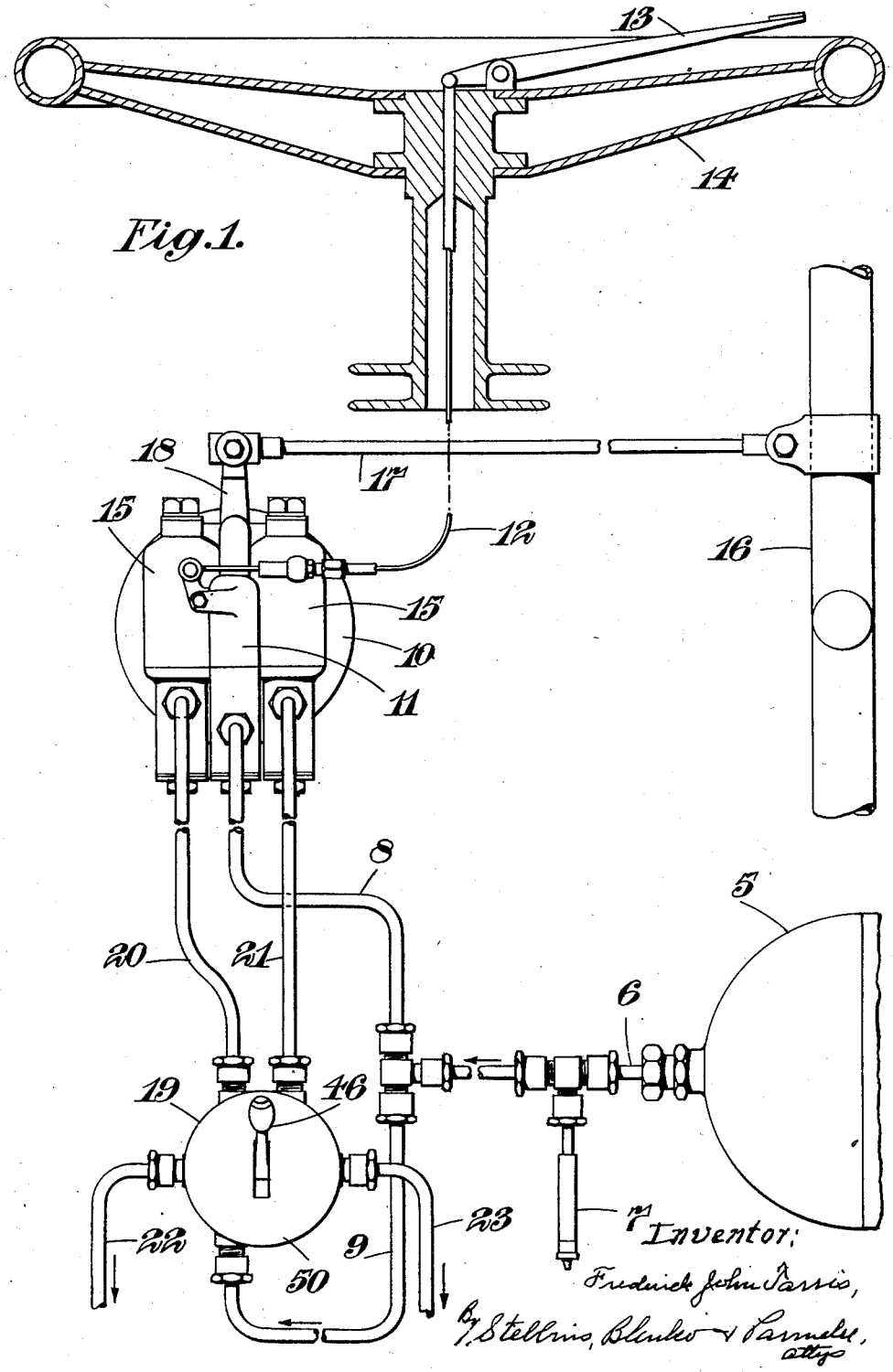

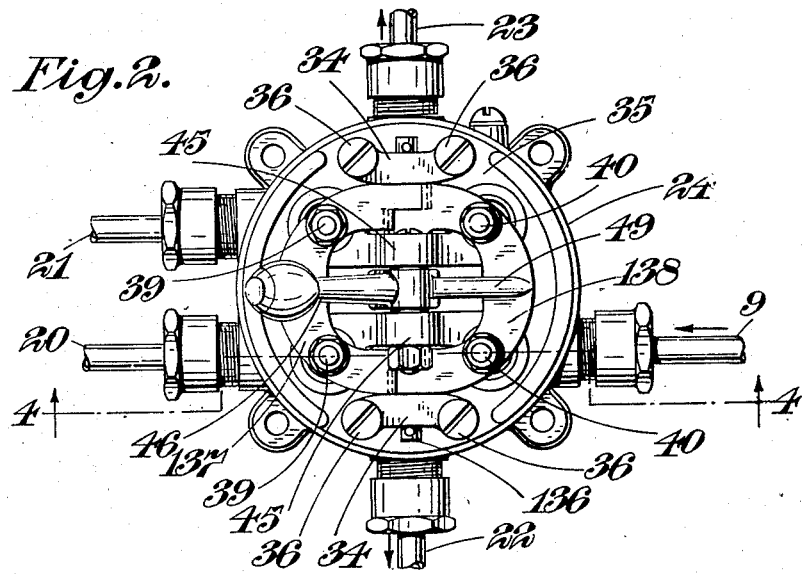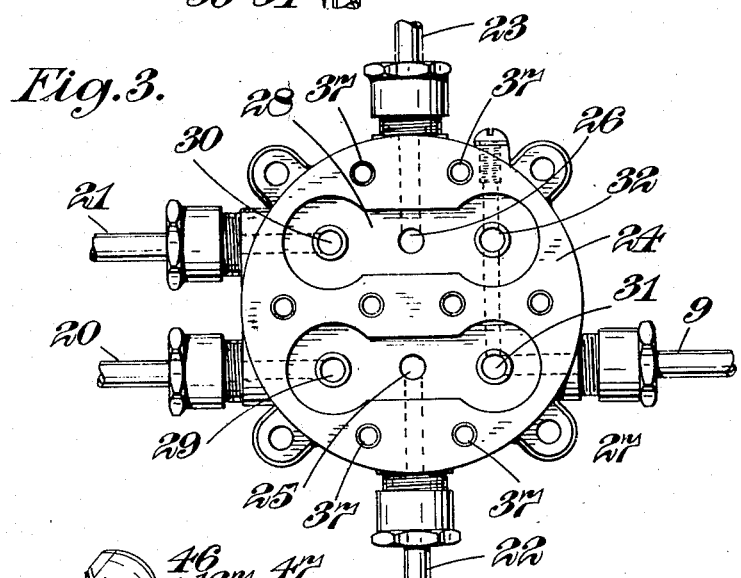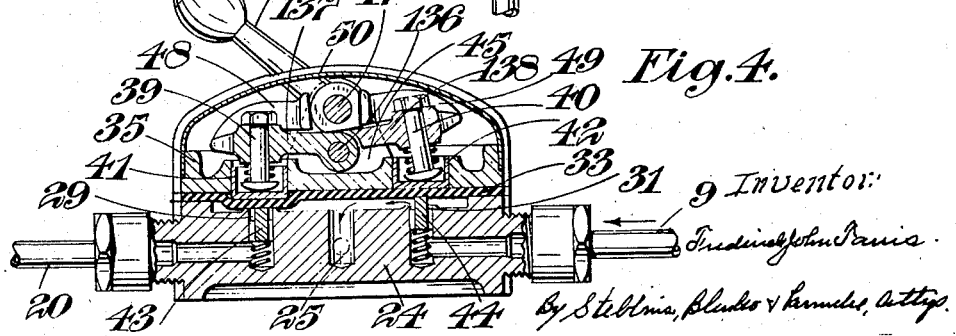

Patented Apr. 4, 1939

2,153,029

UNITED STATES PATENT OFFICE 2,153,029

VALVE FOR VEHICLE BRAKES

Frederick John Tarris, London, England, assignor to The India Rubber, Gutta Percha and Telegraph Works Company Limited, Millbank, London, England, a British company Application January 14, 1937, Serial No. 120,562
In Great Britain January 23, 1936

1 Claim. (Cl. 277—20)

The present invention comprises improvements in or relating to vehicle brakes, and more particularly to such brakes as are power-actuated. It is an object of one constructional form of the invention to provide improved means whereby a power-actuated brake mechanism may be applied or maintained in an applied position independently of the normal brake control device and preferably with the use of the maximum power available.

The invention is intended to be applied to a vehicle brake mechanism actuated by fluid pressure or vacuum comprising a source of fluid pressure or vacuum, a connection between the latter and the brakes subject to the action of a brake regulator, and a second connection between the source of power and the brakes for use alternatively to the first-mentioned connection. Such a mechanism is to be understood hereinafter by the phrase "a vehicle brake mechanism of the type described".

According to the invention there is provided in a vehicle brake mechanism of the type described, a multi-way valve comprising a base having connections for fluid conduits and passages leading from said connections to openings in the upper surface of the base, a flexible diaphragm overlying the base to form one wall of a chamber affording communication between such openings, and means applied to that side of the diaphragm remote from the openings selectively to effect a lateral shift of the diaphragm over small areas adjacent the openings so as to apply the diaphragm directly thereto and close them against passage of pressure fluid.

Such a multi-way valve will normally be connected in a vehicle brake mechanism of the type described to conduits passing to the brakes, the brake regulator and the source of fluid pressure or vacuum so that the two last-mentioned devices may be put into alternative communication with the brakes as desired.

In order that the invention may be more clearly understood a preferred constructional example intended to be employed for controlling the operation of the wheel brakes of aircraft will be described with reference to the accompanying drawings in which:

Figure 1 represents diagrammatically various parts of a control system for aircraft wheel brakes showing the interconnection between the said parts;

Figure 2 is a plan view with the outer cover removed of a multi-way valve employed in the arrangement represented in Figure 1;

Figure 3 is a plan view similar to Figure 2 of a base member for the valve shown in Figure 2; and Figure 4 is a section looking in the direction of the arrows on the line 4—4 of Figure 2.

As a source of power for the operation of the aircraft wheel brakes there is employed a reservoir for compressed air, part of which reservoir is shown at 5 in Figure 1. The reservoir is provided with an outlet conduit 6 to which is connected a filling connection 7. The conduit 6 branches into the fluid conduits 8 and 9, the first conduit 8 of which leads to a device for normal use in controlling the action of the aircraft wheel brakes. The control device is represented at 10 and is conveniently of a form such as that described in the applicant's co-pending United States Patent application Serial No. 120,561, filed January 14, 1937, and now Patent No. 2,142,535, granted Jan. 3, 1939, and capable not only of controlling simultaneous operation of two sets of brake mechanisms respectively associated with wheels situated on opposite sides of a central longitudinal plane of symmetry of the craft but also of effecting a differential adjustment of the two sets of brake mechanisms aforesaid. The fluid conduit 8 is connected to the main control device 11, which latter is conveniently operated by means of the cable 12 leading to a remote control lever 13 mounted within reach of the aircraft pilot on the control wheel 14.

The auxiliary control devices 15 of the control device 10 are operatively connected to the rudder bar 16 or equivalent mechanism of the craft, said operative connection being represented in the drawings by the rod 17 and pivotally mounted member 18 having arms for co-operation with said auxiliary control devices 15. The latter are respectively connected to the two brake sets referred to above. The last-mentioned connections, however, are subject to the control of a valve represented at 19 in Figure 1 and constituting a parking control for applying the brakes when the aircraft is "parked". Fluid conduits 20 and 21 accordingly pass from the auxiliary control devices 15 to the valve 19 to which the conduit 9 already referred to is also connected. The valve 19 is capable of placing the fluid conduit 9 in direct communication with conduits represented at 22 and 23 respectively passing to the brakes associated with the wheels or wheel sets located on opposite sides of the central fore-and-aft plane of symmetry of the craft. Under these conduits the valve simultaneously closes the fluid conduits 20 and 21 which are normally connected to the conduits 22 and 23 respectively when the conduit 9 is closed by the valve 19.

The valve 19 constituting the parking control is shown in greater detail in Figures 2-4 which are drawn to twice full size.

The valve comprises a substantially circular base 24 which is shown in plan view in Figure 3 and around the periphery of which are disposed the connections for the fluid conduits to which reference has already been made. These connections are in communication with the upper surface of the base 24 by means of passages passing through the base and having apertures located in the said upper surface. The passages and apertures are clearly shown in Figure 3. The connections for fluid conduits 22 and 23 passing to the brakes on opposite sides of the centre line of the craft are disposed on the base in diametrically opposed relation and the apertures 25 and 26 in the upper surface of the base 24 in communication with the conduits 22 and 23 are also disposed on the centre line passing through the latter. The passages are in all cases produced by suitable drilling of the base from its periphery and from its upper surface. The apertures 25 and 26 are located in separate parallel recesses 27 and 28 provided in the upper surface of the base 24. On one side of the centre line on which the apertures 25 and 26 are located, a further pair of apertures 29 and 30 are provided towards one end of the recesses 27 and 28. The apertures 29 and 30 communicate respectively with the conduits 20 and 21. On the other side of the said centre line at the other end of the recesses 27 and 28 a further pair of apertures 31 and 32 are provided both in communication through suitable passages shown in dotted lines in Figure 3 with the conduit 9 leading to the pressure reservoir 5. The parking control 19 is adapted to operate by closure of either one or the other pair of apertures 29, 30 and 31, 32 situated in the upper surface of the base 24 and located on opposite sides of the centre line of the apertures 25, 26. For this purpose a rubber diaphragm 33 (see Figure 4) is clamped between the upper surface of the base 24 and an upper part 35 of the valve secured to the base 24 by means of the screws 36 which take into the threaded recesses 37. The screws 36 also serve to secure in place elements 34 carrying a spindle 136 with its axis parallel to the centre line on which the apertures 25 and 26 are located. Pivotally mounted on the spindle 136 are a pair of U-shaped arms 137 and 138 carrying spring-pressed elements 39 and 40 to depress vertically movable parts 41 and 42 carried in the upper part 35 of the valve directly over the pairs of apertures which are to be closed. The vertically movable members 41 an 42 (seen in Figure 4) can depress the rubber diaphragm 33 and hold the latter applied to the apertures which are to be closed. Return movement of the parts 41 and 42 is effected by means of spring-pressed plungers 43 and 44 located in the vertical passages in the base 24 affording the apertures 29 and 31. Similar spring-pressed plungers will be located in those passages terminating in apertures 30 and 32.

The upper part 35 of the valve is also provided with upstanding lugs 45 carrying a lever arm 46 on the pivot 47. The lever arm 46 is provided with cam surfaces 51 and 52 to co-operate respectively with the end surfaces of inwardly directed arms 48 and 49 carried by the U-shaped arms 37 and 38. Movement of the lever arm 46 to one side or the other serves, by the action of its cam surfaces on said arms 48 and 49, to close either the apertures 29 and 30 or the apertures 31 and 32, as desired. A dust cover 50 with a suitable slot to permit movement of the arm 46 is secured to the valve to enclose the upper member 35 and the movable parts of the parking control.

From the above description it will be observed that the parking control normally closes the conduit 9 capable of affording direct communication between the pressure reservoir 5 and through the parking control to the brakes. The latter are thus normally only connected to the auxiliary control devices 15 through the parking control. For parking the aircraft the parking control is moved over and the connections from the auxiliary control devices are cut off and direct connection from the pressure reservoir to the brakes is established. By this means the total available power for the brakes is applied to them when the parking control is operated.

The invention may be modified in that parking pressure may be applied to the brakes from the source of fluid pressure comprising a power-actuated pump or its equivalent in place of a compressed air reservoir. Alternatively, the brakes may be vacuum operated in which case a reservoir is conveniently provided for evacuation to serve as a source of power for operating the brakes.

I claim:

A multi-way valve comprising a base having connections for fluid conduits and passages leading from said connections to openings in the upper surface of the base, a flexible diaphragm overlying the base to cover all the openings in common and to form one wall of a chamber affording communication between such openings as are intended at any time to communicate with one another, said base having a recess in the upper surface thereof in which the last-mentioned openings are disposed in common with one opening at each end and one at the center of the recess, elements to exert pressure on that side of the diaphragm remote from the openings at positions where the diaphragm overlies the openings at the ends of the recess selectively to effect a lateral shift of the diaphragm over small areas adjacent the latter openings to apply the diaphragm directly thereto and close them against passage of pressure fluid so that an appropriate area of the diaphragm itself serves as an actual sealing member for the openings to be closed, pivoted arms to co-operate with said elements, and a cam lever, acting as a toggle lever, selectively to act on the pivoted arms.

FREDERICK JOHN TARRIS.